Dec. 18, 1951  D. B. GARDINER ET AL  2,578,795

RELIEF VALVE

Filed Oct. 13, 1948

INVENTOR.
DUNCAN B. GARDINER
ERNST F. KLESSIG
BY
*Ralph L. Tweedale*
ATTORNEY

Patented Dec. 18, 1951

2,578,795

UNITED STATES PATENT OFFICE 2,578,795

RELIEF VALVE

Duncan B. Gardiner, Detroit, and Ernst F. Klessig, Berkley, Mich., assignors to Vickers Incorporated, Detroit, Mich., a corporation of Michigan Application October 13, 1948, Serial No. 54,282

5 Claims. (Cl. 137—53)

1

This invention relates to power transmissions, and is particularly applicable to those of the type comprising two or more fluid pressure energy translating devices, one of which may function as a pump and another as a fluid motor.

The invention is particularly concerned with relief valves for controlling the pressure in such systems. Although the construction features of relief valves differ widely the majority follow the basic principle of having a valve mechanism shiftably mounted in the body and resiliently biased upon a seat so as to normally close communication between a pressure inlet port and an exhaust port. The valve mechanism is designed to be pressure operated to the open position in response to predetermined pressure increases at the inlet and upon predetermined pressure decreases the resiliently biasing means will shift the valve to the closed position.

Although there are many simply constructed relief valves which will perform the simple functions for which they are designed, they will not operate efficiently in hydraulic systems where large capacity flow at high pressures must be accurately controlled within predetermined pressure ranges, and in particular where it is desired that the relief valve be leak-proof at pressures below the predetermined opening pressure. Where the requirements of the system demand accurate control within a narrow predetermined pressure differential, and leak-proof features below maximum opening pressure, the manufacturing costs of the relief valve are greatly increased. The valve for controlling the seat must be accurately machined so as to cooperate with the seat opening. Likewise, the concentricity of body bores and the seat opening must be held within very close tolerances. This is necessarily so because the body bore within which the valve mechanism is shiftable is in cooperative relationship with the valve seat opening.

It is an object of this invention to provide a relief valve containing pressure operated valve mechanism for opening and closing the valve seat of such a construction that the concentricity of the body bores and the seat opening do not have to be held to as close tolerances as those in other pressure relief valves of this type.

It is also an object of this invention to provide valve mechanism which includes a valve member for opening and closing the seat comprising a double ball-ended rod already being mass-produced and utilized as connecting rods in rotary pumps of the reciprocating piston type. Methods for accurately machining these double ball-ended rods in large quantities at low cost have been devised so that expensive machining of specially and accurately constructed valve mechanism is avoided.

It is also an object of this invention to provide

2 a liquid pressure relief valve including valve mechanism for controlling the seat opening which will compensate for slight errors in concentricity between the body bores in which the valve mechanism is mounted and the valve seat opening.

It is still another object of this invention to provide a liquid pressure relief valve which permits greater tolerances in body bore and seat opening concentricities by providing valve mechanism which permits a floating relationship between the valve and the seat opening to insure positive seating of the valve and thus prevent leakage.

It is a further object of this invention to provide at low cost a relief valve which will accurately control large capacity flow at high pressures and which will operate efficiently over a long and useful life.

In many cases the operation of the main valve member which controls large capacity flow through a valve seat opening is controlled by a smaller pilot relief valve. In this manner, the spring biasing means for the main relief valve which handles the large capacity flow may be made much lighter, because the pressures at which the main valve opens and closes is determined by the setting of the pilot relief valve spring. As the pilot relief valve only has to handle a slight flow sufficient to vent the main relief valve, it may be made much smaller and because of the much smaller effective pressure surface areas involved the spring utilized will be more accurately responsive to smaller differentials in opening and closing pressures. An example of this type of construction is disclosed in the patent to Vickers No. 2,043,453.

Although pilot relief valve control of the operation of the main valve results in greater efficiency and more accurate control than if the main valve were directly pressure operated, it is important to note that the degree of accurate control of the main valve may differ widely dependent upon the pilot relief valve utilized for controlling the operation of the main valve. It may be said that the control of the valve is most accurate when the differential between the opening and closing pressures of the pilot valve is maintained within close limits. The wider the differential, the less accurate the valve becomes. There are certain types of pilot relief valves, such as the spring biased ball type which are incapable of giving accurate control within narrow pressure limitations. When a valve of this type opens, although the surface area exposed to pressure increases, the accumulation of static pressure forces decrease because of high velocity flow. Consequently, the valve tends to close and further increases of pressure are necessary to maintain the valve unseated. This results in chattering and an unstable condition of the valve. In addition the pressure must drop to a lower pressure than opening pressure before the valve will shut.

It is therefore another object of this invention to provide in combination with a main relief valve, a pilot relief valve for controlling the operation of the main valve having improved regulating characteristics.

It is a further object of this invention to provide a pilot operated relief valve, the main valve and body therefor which may be manufactured at lower cost than prior valves of this type and a pressure responsive pilot relief valve for controlling the main valve member which is designed to open and close within a narrow pressure differential and which is non-chattering at the opening stage.

It is also an object of this invention to provide a relief valve which, in addition to being utilized as a pilot relief valve for controlling the operation of a main relief valve, may also be utilized as a directly operated pressure relief valve for efficiently and accurately handling large capacity flow.

Further objects and advantages of the present invention will be apparent from the following description, reference being had to the accompanying drawing wherein a preferred form of the present invention is clearly shown.

Figure 1:
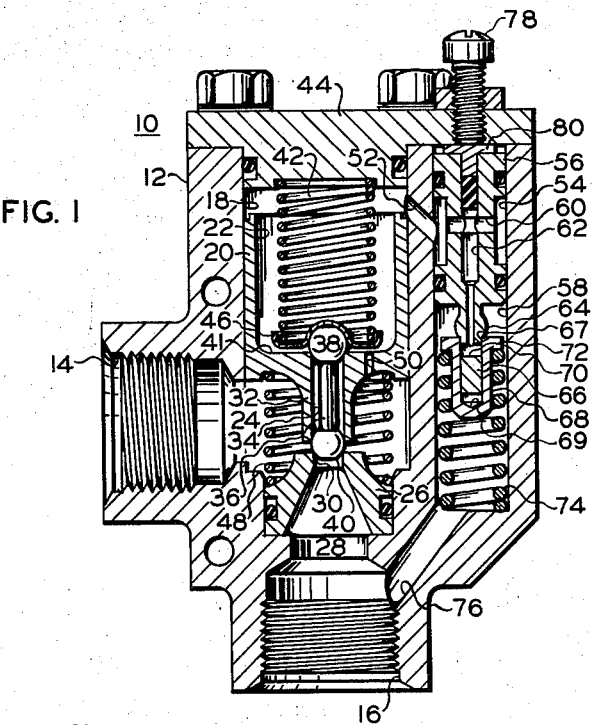
Figure 1 is a sectional view of a preferred form of the present invention.

Referring now to Figure 1 there is shown a liquid pressure relief valve 10 comprising a body 12 provided with an inlet port 14 and an exhaust port 16, both of which are directly connected to a vertical bore 18. Shiftably mounted in the bore 18 is a piston 20 which partitions the bore 18 into a control chamber 22 above the piston 20 and an inlet chamber 24 immediately below the piston 20 which is directly connected to the inlet port 14. A valve seat member 26 stationarily mounted on a step in the bore 18, below the inlet chamber 24, forms a partition in the remainder of the bore 18 creating an exhaust chamber 28 below the seat which is directly connected to the exhaust port 16. The valve seat 26 is provided with an opening 30 which connects the inlet chamber 24 to the exhaust chamber 28.

The piston 20 is provided with a neck 32 adapted to extend into the inlet chamber 24 and a centrally located vertical bore 34 extending completely through the piston in the neck region thereof. Valve mechanism for controlling the seat opening 30 is carried by the piston 20 and comprises a rod indicated by the numeral 36 having a ball-shaped head at each end indicated by the numerals 38 and 40. The diameter of the head 38 is larger than the diameter of the piston bore 34 so that the under surface of the head is enabled to contact a portion of the effective surface area of the piston 20 exposed to pressure in the control chamber 22 and indicated by the numeral 41 and thus suspend the rod 36 within the piston bore. The head 40 has a slightly smaller diameter than the piston bore 34 and extends past the lower end of the bore for the purpose of controlling the seat opening 30. As the diameter of the rod is substantially smaller than the diameter of the piston bore 34, it can be clearly seen that the double ball-ended rod is slightly tiltable. Consequently, even though the piston bore 34 and the seat opening 30 are not in exact alignment, the seating surface of valve head 40 being rounded, is enabled to locate the seat opening 30 and positively close the same. Likewise, if that portion of the vertical bore 18 within which the seat 26 is mounted is not in exact concentricity with that portion of the bore 18 within which the piston 18 is mounted, the tiltability of the double ball-ended rod enables the valve member 40 to locate the seat 30. As previously stated, the double ball-ended rod is preferably the same member being produced as piston pump connecting rods for which methods have been devised for accurately manufacturing the same in mass at low cost.

The piston 20 is biased to the position shown so that the valve member 40 closes the seat opening 30 by means of a spring 42 mounted in the control chamber. One end of the spring 42 abuts the under surface of an end cap 44 which closes the vertical bore 18, and the other end abuts a spring retainer 46 which serves to hold the head 38 in engagement with a portion of the upper effective pressure surface area of the piston 20.

Thus, the spring 42 in cooperation with the retainer 46 biases the head 38 in engagement with the piston 20 and also serves to bias the piston 20 to a position so that the poppet valve 40 closes the seat opening 30. An auxiliary spring 48 is provided for aiding in holding the piston 20 in engagement with the head 38 and also aiding in positioning the piston 20 in the bore 18.

Although the piston 20 may be directly pressure operated by venting the control chamber directly to an exhaust source, it is preferred that for greater efficiency and more accurate control that the main valve be controlled by a pilot relief valve. For this purpose, the piston 20 is provided with a restricted passage 50 extending therethrough which connects the inlet chamber 24 with the control chamber 22 and the control chamber is connected to pilot relief valve mechanism in the following manner. The control chamber 22 is connected by a passage 52 to a plurality of inlet ports 54 provided in a valve member 56 which is stationarily but adjustably mounted in a vertical bore 58. The inlet ports 54 are connected by a transverse passage 60 to a vertical passage 62 extending completely through the member and a poppet valve 64 formed at the end of the member.

The poppet valve 64 is provided with a projection 66 which extends through an opening 67 of a hollow valve seat 68 which is closed at the other end to form a pressure effective surface area indicated by the numeral 69. The projection 66 is adapted to act as a guide for the valve seat 68 and aids in preventing chattering. The projection 66 is provided with a transverse passage 70 extending completely therethrough located just below the poppet valve and to which the vertical passage 62 is connected. The valve seat 68 is cup-shaped in form having a flange 72. A spring 74 of predetermined resistance mounted in the lower half of the vertical bore 58 abuts the under surface of the flange 72 in order to maintain the seat 68 on the valve 64. An angular passage 76 connects the lower end of the vertical bore 58 to the exhaust chamber 28 of the main valve. The end cap 44 closes the upper end of the vertical bore 58. An adjustable screw 78 threaded through the end cap 44 abuts a member 80 stationarily mounted in the upper end of the passage 67 in sleeve 56. The screw may be adjusted so that the valve member may be moved inwardly into the vertical bore 58 to move the seat and further compress the spring 74, thereby adjusting the resistance of the same.

Figure 2:
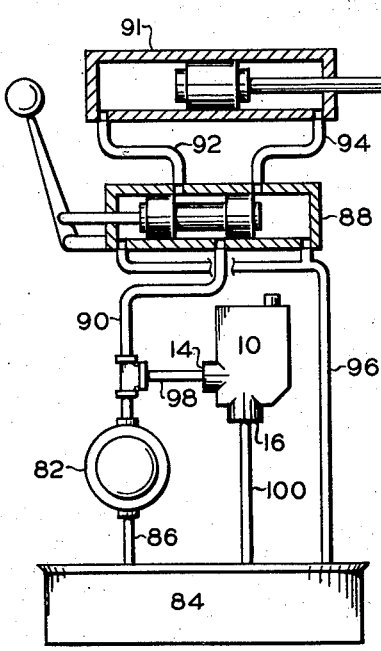
Figure 2 is a diagrammatic view of a hydraulic power transmission system incorporating the present invention.

Referring now to Figure 2, there is shown a basic hydraulic system comprising a pump 82 which may be driven by any suitable means, not shown, which is connected to a tank 84 by a suction conduit 86 and to a four-way directional control valve 88 by a pressure delivery conduit 90. The control valve 88 is connected to opposite ends of a reciprocating piston type motor 91 by means of conduits 92 and 94, and to the tank by means of a branched conduit 96. The relief valve 10 may be incorporated in the system by a branch line 98 connected to the pressure delivery conduit 90 and to the pressure inlet port 14, and by an exhaust conduit 100 connected to the exhaust port 16 and to the tank 84.

Referring to Figures 1 and 2, with the pump 10 in operation and the position of the control valve as shown, pressure fluid is delivered to the left end of the motor 91 by conduit 90, control valve 88, and conduit 92. Fluid exhausted from the right end of the motor is delivered to tank 84 by conduit 94, control valve 88, and conduit 96. The resistance of the pilot valve spring 74 will be set above the pressure operating requirements of the motor 91 so that while the motor is operating under normal conditions, the pressure communicated to the effective pressure surface area 69 of the pilot valve seat will not shift the seat from the valve 64. Pressure is communicated to the effective pressure surface area 69 of the seat 64 by means of branch conduit 98, inlet port 14, inlet chamber 24, restricted passage 50, control chamber 22, passage 52, valve member inlet ports 54, and vertical passage 62 and transverse passage 72. The projection 66 fits loosely in the hollow portion of the seat so that pressure fluid may flow around the projection to the bottom of the seat to tend to force the same downwardly and shift the seat away from the poppet valve 64. The piston 20 is not only retained in the position shown by the difference in biasing strength between the springs 42 and 48, but is also maintained in the closed position by a slight pressure force unbalance corresponding to the pressure times the area of the seat opening 30. When the motor 91 has completed a rightward directional movement, there is an immediate pressure increase which will overcome the resistance of the pilot valve spring 74 and the seat 68 will be shifted downwardly from the poppet valve 64. The control chamber 22 of the main valve is then vented to tank through the angular passage 52, the valve member inlet ports 54, and passages 60, 62, and 70, the bore 58, angular passage 76, exhaust chamber 28, exhaust port 16, and conduit 100. Fluid from the control chamber is vented to tank through the pilot relief valve faster than pressure fluid may enter the control chamber 22 of the main valve because of the restriction 50 in the piston 20. Because of the pressure drop across the restriction an unbalancing of the pressure forces above and below the piston in the control chamber 22 and inlet chamber 24, respectively, takes place. The piston 20 is shifted upwardly carrying the double ball-ended rod 36 with it and the poppet valve 40 is thus lifted from the main valve seat 26. Pump delivery is then exhausted to the tank 84 through the main valve inlet chamber 24, the main valve seat opening 30, exhaust chamber 28, exhaust port 16, and conduit 100. If, at any time during the operation of the motor 91, either in a leftward or rightward directional movement, the pressure in the system arises above the setting of the pilot relief valve spring 74, the relief valve mechanism will operate in the same manner to regulate the pressure by exhausting excessive pressure fluid to the tank 84 until the pressure falls below the setting of the pilot relief valve spring 74.

It should be noted that when the pilot valve seat 68 is shifted downwardly away from the pilot poppet valve 64 that the surface area 69 on which the pressure acts to shift the seat does not change. Where the construction of the valve and seat is such that the surface on which the pressure acts becomes larger when the seat is opened, there is a tendency to create an unstable condition causing vibration and noise. Thus, one of the major causes for vibration and noise has been removed by the construction disclosed, that is, by designing the pilot relief valve so that the seat shifts away from the poppet valve and causing the pressure to act upon a pressure effective seat surface area which does not change from the first opening point to full opening. Vibration of the seat is also substantially prevented by the projecting portion 66 of the poppet valve 64. The projecting portion acts as a guide for the shifting seat and prevents vibration. It is also very important to note that as the effective pressure area of the seat does not change when the seat is opened that the pressure will not have to drop to a lower pressure than opening pressure before the seat closes. The regulation is thus improved because a substantially narrow differential between opening and closing pressures may be maintained by proper construction and design of the spring 74. A damping action is also provided by the loose fit of the projection 66 in the seat 68. When the pressure decreases below the setting of the spring 74 and the seat is forced back to the poppet valve, fluid in the seat on the underside of the projection 66 must be displaced around the projection 66.

When the pressure drops below the setting of the pilot relief valve spring 74 and the pilot relief valve closes the control chamber 22 from communication with the exhaust port 16, the pressure forces existing in the control chamber 22 and the inlet chamber 24 of the main valve again become unbalanced, and because the effective area of the piston exposed to pressure in the control chamber is larger than the effective surface area of the piston exposed to pressure in the inlet chamber 24, the piston 20 will shift downwardly aided by the force of the light spring 42 carrying the double ball-ended rod so that the main poppet valve 40 will close the main seat opening 30. As previously stated, the valve 40 is enabled to positively locate the seat 26 and close the opening 30 thereof because the rod 36 is slightly tiltable in the piston bore 34. In spite of errors in concentricity tolerances between the piston bore 34 and the seat opening 30 or between that portion of the bore 18 in which the piston 20 is mounted and the portion of the bore that the seat 26 is mounted, the poppet valve 40 will positively locate the seat opening and close the same. As the valve 40 is of the rounded poppet type, the valve 40 will positively close the seat opening 30.

It should be noted that the pilot relief valve may be utilized alone as a directly operated pressure relief valve by enlarging the valve proportions and providing a separate body therefor. Likewise, the main relief valve may be utilized alone as a directly pressure operated relief valve by omitting the pilot relief valve and venting the control chamber 22 directly to an exhaust. The main piston 20 may be utilized by plugging the restriction 50 or the piston 20 may be manufactured without the restriction. The greatest efficiency and accurate control of large capacity flow at high pressures may be secured, however, by controlling the main relief valve by a pilot valve of the type disclosed. The main valve mechanism, as previously stated, may be economically manufactured because concentricity of body bores and of the seat opening does not have to be held to as close tolerances as former valves of this type. Furthermore, the double ball-ended rod carried by the piston for controlling the seat opening is already being economically mass-produced as piston connecting rods for piston pumps. The manufacture of specially constructed valve mechanism is thus avoided by utilizing the economical mass-production methods already provided in the manufacture of the connecting rods. The pilot valve may also be economically manufactured and provides a non-chattering valve which may be operated within a narrow pressure differential between opening and closing.

While the form of embodiment of the invention as herein disclosed constitutes a preferred form, it is to be understood that other forms might be adopted, all coming within the scope of the claims which follow.

What is claimed is as follows:

1. In a fluid pressure control valve comprising a body having an inlet and an outlet connected by a flow passage interposed within which is a valve seat, a piston shiftably mounted in the body having a pressure effective surface area hydraulically connected to the passage, a bore extending through the piston in substantial alignment with the valve seat opening, a rod mounted in the bore having a head at each end, one head being larger than the bore and acting to suspend the rod in the piston bore and the other head being formed in the shape of a poppet valve and extending from the pressure effective surface area for controlling the seat, and resilient means biasing the one head in engagement with the piston and the piston to a position so that the poppet valve closes the seat.

2. A relief valve for use in hydraulic power transmission systems comprising a body having an inlet chamber, an exhaust chamber and a valve seat, the opening through which hydraulically connects the two chambers, a piston shiftably mounted in the body having a pressure effective surface area exposed to pressure in the inlet chamber, a bore extending through the piston in substantial alignment with the valve seat opening, a rod suspended in the bore having a head at each end, one head being larger than the bore and engaging the surface area of the piston opposed to the pressure effective surface area and the other head being shaped in the form of a poppet valve and extending from the pressure effective surface area of the piston for controlling the seat opening, and means resiliently biasing the one head in engagement with the piston and the piston to a position so that the poppet valve closes the seat opening.

3. A relief valve for use in hydraulic power transmission systems comprising a body having an inlet chamber, an exhaust chamber, and a control chamber including a venting port leading from said chamber adapted for connection to a pressure responsive pilot relief valve for venting the control chamber, a valve seat, the opening of which connects the inlet chamber to the exhaust chamber, a piston shiftably mounted in the body having opposed pressure surface areas, one of which is exposed to pressure in the control chamber and the other of which is exposed to pressure in the inlet chamber, means forming a restricted passageway connecting the inlet chamber to the control chamber, a rod having a head at each end carried by the piston, one head engaging the surface area of the piston exposed to pressure in the control chamber and the other head being shaped in the form of a poppet valve and extending from the surface area exposed to pressure in the inlet chamber for controlling the seat opening, and means resiliently biasing the piston to a position so that the poppet valve closes the seat opening.

4. A relief valve for use in hydraulic power transmission systems comprising a body having an inlet chamber, an exhaust chamber, and a control chamber including a venting port leading from said chamber adapted for connection to a pressure responsive pilot relief valve for venting the control chamber, a valve seat, the opening of which connects the inlet chamber to the exhaust chamber, a piston shiftably mounted in the body having opposed pressure surface areas, one of which is exposed to pressure in the control chamber and the other of which is exposed to pressure in the inlet chamber, means forming a restricted passageway connecting the inlet chamber to the control chamber, a bore extending through the piston in substantial alignment with the valve seat opening, a rod mounted in the bore having a head at each end, one head being larger than the bore and acting to suspend the rod in the bore and the other head being formed in the shape of a poppet valve and extending from the pressure effective surface area of the piston for controlling the seat, and resilient means biasing the one head in engagement with the piston surface exposed to pressure in the control chamber and biasing the piston to a position so that the poppet valve closes the seat.

5. A relief valve for use in hydraulic systems comprising a body having a pressure inlet and an exhaust outlet connected by a flow passage interposed within which is a valve seat, a piston shiftably mounted in the body and arranged to form a control chamber and an inlet chamber on opposite sides thereof, means forming a venting port leading from the control chamber adapted to be connected to a pressure responsive pilot relief valve for venting the control chamber, means forming a restriction connecting the pressure inlet to the control chamber, a two headed rod tiltably carried by the piston, one head being shaped as a poppet valve for controlling the valve seat, and resilient means biasing the piston to a position so that the poppet valve closes the valve seat.

DUNCAN B. GARDINER.
ERNST F. KLESSIG.

REFERENCES CITED

The following references are of record in the file of this patent:

UNITED STATES PATENTS

| Number | Name | Date |
|---|---|---|
| 1,892,344 | Huber | Dec. 27, 1932 |
| 1,998,223 | Czarnecki | Apr. 16, 1935 |
| 2,090,035 | Fellows | Aug. 17, 1937 |
| 2,351,841 | Seem | June 20, 1944 |